United States Patent [19]
Ernest et al.

[11] Patent Number: 5,969,760
[45] Date of Patent: *Oct. 19, 1999

[54] ELECTRONIC STILL CAMERA HAVING MECHANICALLY ADJUSTABLE CCD TO EFFECT FOCUS

[75] Inventors: Paul W. Ernest, Lynnfield; John C. Ostrowski, Maynard; Massimo A. Russo, Brookline, all of Mass.

[73] Assignee: Polaroid Corporation, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,142

[22] Filed: Mar. 14, 1996

[51] Int. Cl.$^6$ ............................. H04N 5/225; H04N 5/232
[52] U.S. Cl. ......................... 348/357; 348/219; 348/348; 396/118
[58] Field of Search ................................ 396/79, 83, 118, 396/105; 348/345, 348, 349, 351, 353, 354, 357, 374; 358/906, 909.1; H04N 5/232, 5/225

[56] References Cited

U.S. PATENT DOCUMENTS

| | | |
|---|---|---|
| 3,573,367 | 4/1971 | LaRue, Jr. ............................... 348/357 |
| 4,318,135 | 3/1982 | Allis et al. . |
| 4,490,814 | 12/1984 | Shenk ...................................... 367/140 |
| 4,558,367 | 12/1985 | Urata et al. . |
| 4,570,185 | 2/1986 | Arai et al. . |
| 4,734,778 | 3/1988 | Kobayashi . |
| 4,841,370 | 6/1989 | Murashima et al. . |
| 4,842,387 | 6/1989 | Murakami et al. . |
| 4,853,788 | 8/1989 | Murashima et al. . |
| 4,853,789 | 8/1989 | Murashima et al. . |
| 4,903,134 | 2/1990 | Murashima et al. . |
| 4,924,317 | 5/1990 | Hirao et al. . |
| 5,032,919 | 7/1991 | Randmae . |
| 5,075,777 | 12/1991 | Murata . |
| 5,101,278 | 3/1992 | Itsumi et al. . |
| 5,140,357 | 8/1992 | Suda et al. . |
| 5,142,312 | 8/1992 | Suzuki et al. . |
| 5,402,174 | 3/1995 | Takahashi . |
| 5,416,519 | 5/1995 | Ohtake . |
| 5,444,485 | 8/1995 | Uchioke et al. . |
| 5,453,784 | 9/1995 | Krishnan et al. . |
| 5,640,207 | 6/1997 | Rahmouni et al. . |

*Primary Examiner*—Tuan Ho
*Assistant Examiner*—Ngoc-Yen Vu
*Attorney, Agent, or Firm*—Thomas P. Grodt

[57] ABSTRACT

An electronic still camera is disclosed which adjusts focus to an object image by mechanically moving an electronic sensor within the electronic still camera. The electronic sensor is moved along an optical path of the electronic still camera. In this way, the sensor follows the focal plane of the image, thus tracking a focused image.

14 Claims, 6 Drawing Sheets

United States Patent 5,969,760

ELECTRONIC STILL CAMERA HAVING MECHANICALLY ADJUSTABLE CCD TO EFFECT FOCUS

BACKGROUND OF THE INVENTION

The present invention relates generally to digital imaging cameras, and, more particularly, the invention relates to electronic still cameras having a mechanically adjustable sensor for adjusting image focus.

Conventional imaging cameras have long adjusted focus by physically moving a lens in an optical system of the conventional camera. The movement of the lens can be automatic movement driven by a motor, or manual movement under user control. In either case, the lens itself is mechanically moved relative to a film plane. It is well known in the art that as an object comes in from an infinite distance with respect to a lens, a focal plane on which the lens forms a sharp image when correctly focused is moved away from the lens. Thus, to correctly focus the image of an object onto a film plane, the lens is mechanically moved away from the film plane. Analogously, electronic still cameras have provided a similar function where, instead of a film in the film plane, there is an electronic sensor, such as a charge-coupled device ("CCD"), which is in the film plane. A problem with this type of focusing system is that lenses are often interchangeable on a camera, thus making a lens system that is individually moveable and interchangeable very costly. In addition, each lens system that is interchanged onto the camera must have the same functionality, i.e., each must be user adjustable or adapted to be driven by a motor.

Accordingly, it is an object of this invention to provide an electronic still camera that works with statically mounted lenses while optimizing image focus.

It is another object of this invention to provide an electronic still camera that reduces a cost of accessories by reducing an overall cost of interchangeable lens systems for the electronic still camera.

These and other objects of the invention will be obvious and will appear hereinafter.

SUMMARY

The aforementioned and other objects are achieved by the invention which provides an electronic still camera having a mechanically adjustable sensor. The mechanically adjustable sensor is useful with electronic still cameras having at least one lens for focusing image-bearing light reflected from a subject along an optical path onto the electronic sensor. The electronic sensor then converts the image-bearing light into electronic signals representative of the subject.

The electronic still camera comprises an adjustment means which moves the sensor along the optical path relative to the at least one lens such to focus an image of the subject. The adjustment means in the preferred embodiment is a lead screw driven by a stepper motor. The stepper motor rotates the lead screw such that the lead screw moves in and out relative to the lens, and substantially parallel to the optical path. The lead screw mechanically contacts the sensor so as to push the sensor forward toward the lens or to relieve pressure on the sensor such that spring action can push the sensor back away from the lens. In this way, the sensor is being moved relative to the lens thus focusing the image in the electronic still camera.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of photographic devices and may be embodied in several different forms, it is advantageously employed in connection with an electronic still camera. Though this is the form of the preferred embodiment and will be described as such, this embodiment should be considered illustrative and not restrictive.

Figure 1:
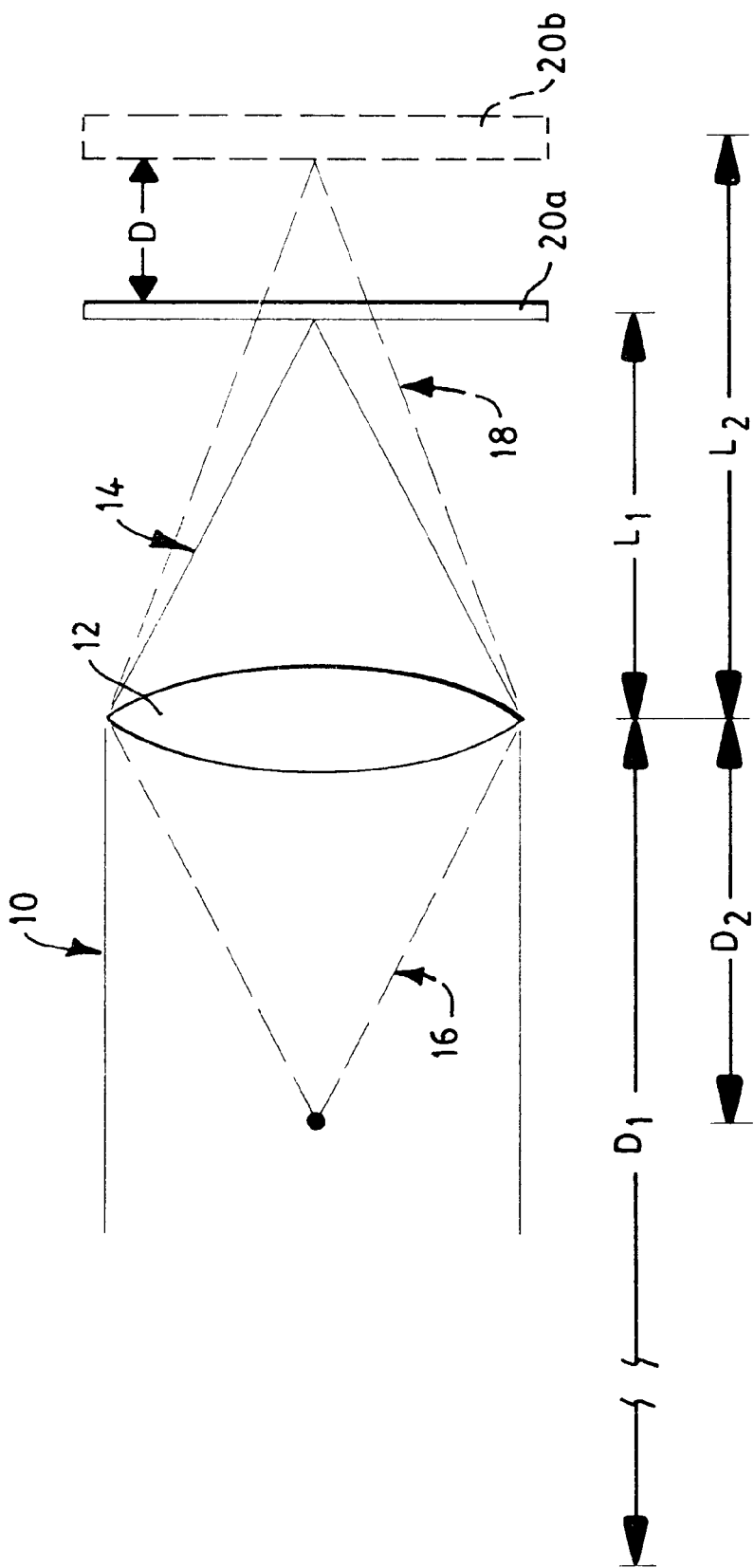
FIG. 1 shows a ray trace diagram with a cross-section of a lens sensor combination in accordance with the invention.

FIG. 1 shows two ray traces, where the solid line 10 represents a ray trace of light reflected off an object located a distance D1 from the lens 12. In this case, D1 equals infinity. Since the object is located at infinity, the incident rays 10 are substantially parallel to the lens axis such that as the rays 10 pass through the lens 12, the focused rays 14 intersect at a focal point which is a distance $L_1$ from the lens 12. Since the object being imaged is located at infinity, the distance $L_1$ is defined as being the focal length of the lens 12.

As the object is moved in from infinity relative to the lens 12, the reflected light rays reflected from the object ceased to be parallel. Image rays 16 depicted in FIG. 1 as dashed lines from the object located a distance $D_2$ from the lens pass through the lens 12 and the focused rays 18 then intersect at a distance $L_2$ which is greater than $L_1$, i.e., $L_2 > L_1$. Therefore, the focal plane, which is a plane on which a lens forms a sharp image when correctly focused has moved a distance D, where D is equal to $L_2 - L_1$.

In contrast to the conventional imaging systems previously described which shift the focal plane by physically moving the lens 12, the invention moves the sensor 20A, which is shown located normal at the focal length of the lens back to a position D away from the lens, shown as 20B. In the preferred embodiment, the sensor is a charge coupled device ("CCD"), but it can also be any of various other electronic imaging sensors such as charge injection devices ("CID"), inter alia.

Figure 2:
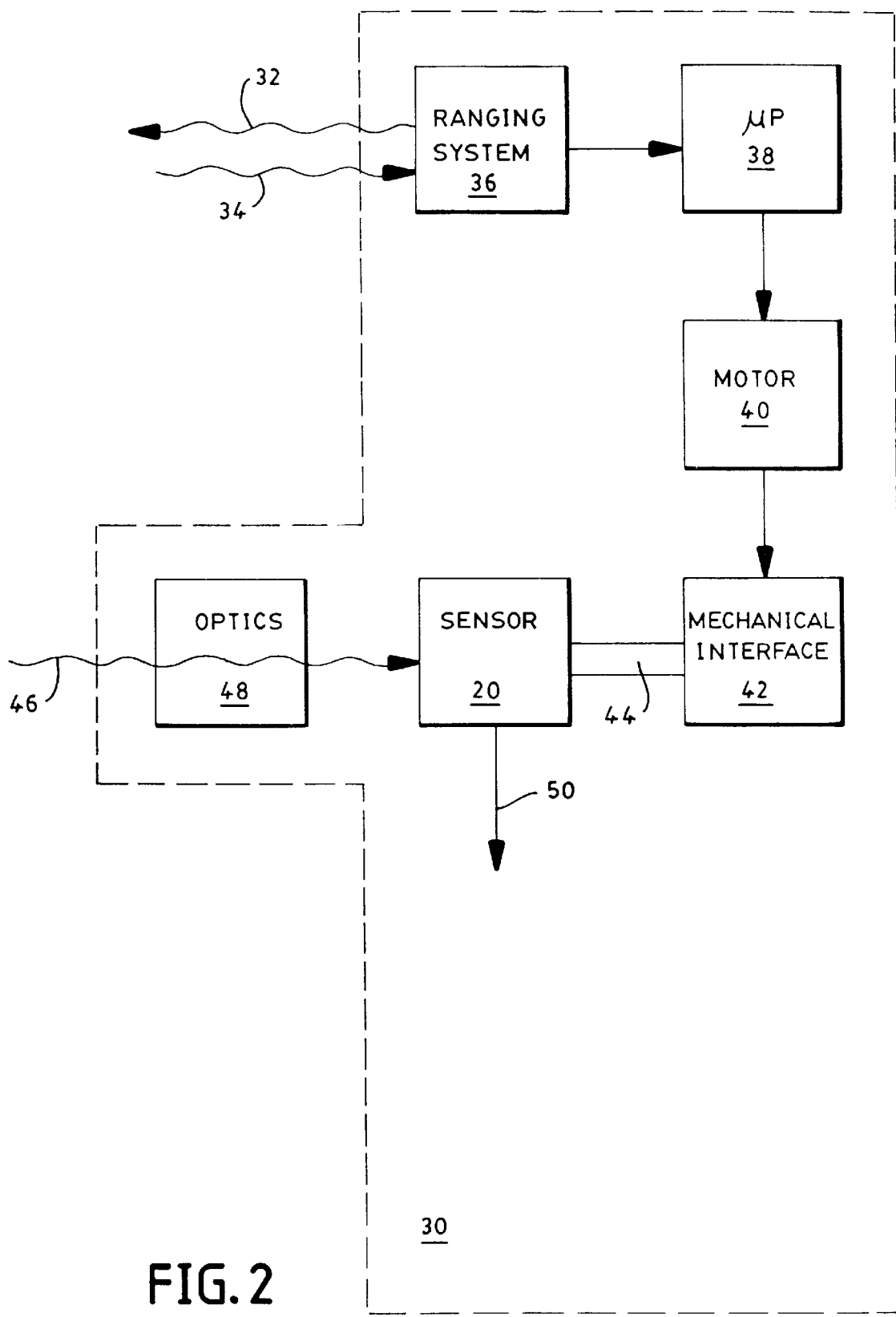
FIG. 2 shows a block diagram of an electronic still camera using the invention as shown in FIG. 1.

FIG. 2 shows an electronic still camera of the invention where the electronic still camera 30 uses a ranging system 36 to determine a distance to an object. The ranging system 36 transmits an electronic signal 32 aimed at the object and measures an amount of the reflected signal 34 reflected from the object. In the preferred embodiment the ranging system 36 is a calibrated sonar ranging system such as that shown in commonly assigned U.S. Pat. No. 4,490,814, issued to Edwin K. Shenk on Dec. 25, 1984.

The ranging system then passes a signal representative of a distance to the object to a microprocessor 38. The microprocessor 38 then looks up in a table stored in a memory inherent to the microprocessor 38 what the proper location of the focal plane is given that distance. Upon determining the proper distance of the focal plane, the microprocessor signals a motor 40 to mechanically adjust the sensor 20.

The adjustment is performed using a mechanical interface 42 which translates between the motor 40 and the sensor 20 via an actuation device 44. The actuation device 44 mechanically adjusts a location of the sensor 20 so as to follow the changing focal plane. Thus, image-bearing light 46 reflected from the object can pass through optics 48 and be incident upon the sensor 20 in a proper focal plane so as to achieve a focused image. The sensor 20 can then pass electronic signals representative of the image 50 to associated internal electronics of the electronic still camera 30.

Figure 3A:
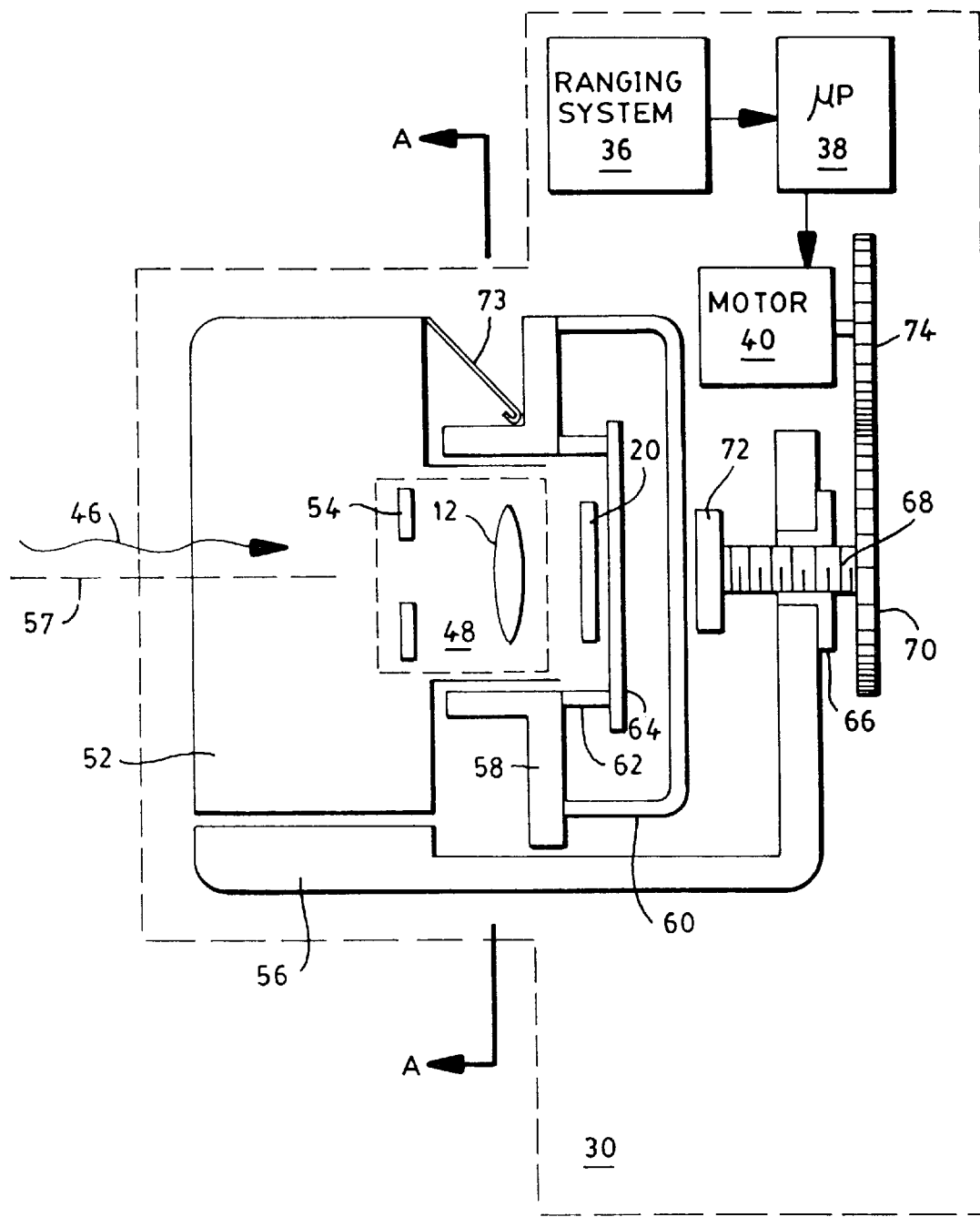
FIG. 3A shows a mechanical drawing of an electronic still camera using the system described in FIG. 2.
Figure 3B:
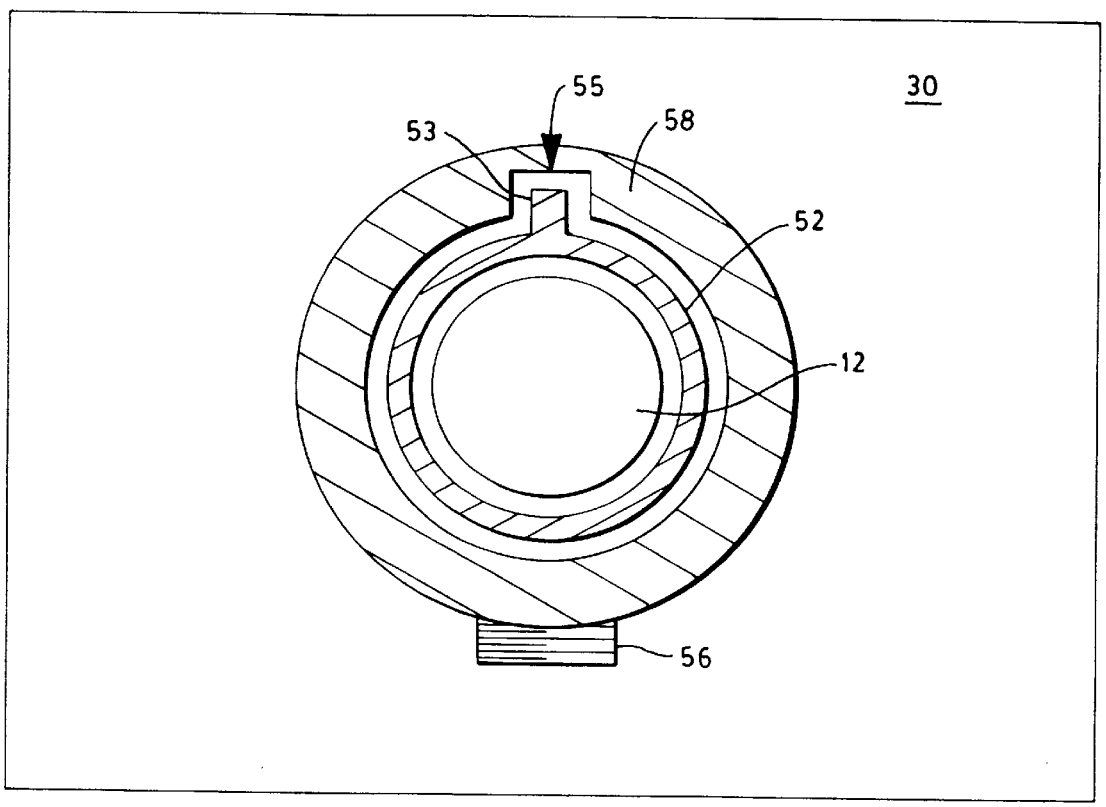
FIG. 3B shows a cross-sectional view of the electronic still camera of FIG. 3A.

FIGS. 3A and 3B illustrate a particular embodiment of the electronic still camera 30 showing the mechanical design of such a system. As previously described, the image-bearing light 46 reflected from an object comes into an optical system 48 of the electronic still camera 30. In the preferred embodiment, the electronic still camera 30 encloses the optics 48 in an optical housing 52 which is made to receive interchangeable lens systems (not shown). Due to the fact that the electronic still camera 30 adjusts focus internally, the interchangeable lens systems simply need to be statically mounted lenses having the properties desired by the photographer.

The optical system 48 includes a lens 12 or lens system and a shutter 54. When the shutter 54 opens, an aperture is created allowing the image bearing light 46 to pass therethrough, thus striking the sensor 20.

The optical housing 52 is held on a frame 56 which passes into the internals of the electronic still camera 30 and is, in turn, mechanically connected to the housing of the electronic still camera 30.

A sensor housing 60 is connected to an alignment cylinder 58 which has a close sliding fit with the optical housing 52. The alignment cylinder 58 is disposed over the optical housing 52 such that reciprocal motion is enabled. Alignment of the alignment cylinder 58 is accomplished using an alignment pin 53 extending from the optical housing 52 into a groove 55 in the alignment cylinder 58; thus, preventing rotation of the sensor housing 60 about the optical axis 57.

The sensor housing 60 is in mechanical contact with a wear plate 72. The wear plate 72 is mechanically secured to the sensor housing 60 by an adhesive in the preferred embodiment. One skilled in the art will realize, though, that other means of attachment can be used such as welding, screws, et cetera.

The wear plate 72 is secured to a back portion of the sensor housing 60 such that force applied to the wear plate 72 pushes the sensor housing 60 forward with respect to the optical system 48.

Opposing this force is a spring 73 which elastically biases the sensor housing an alternative embodiment of 60 away from the optical system 48. Thus, as the lead screw 68 is driven backward, away from the lens, the spring 73 moves the sensor housing likewise away from the lens.

The wear plate 72 is driven by a lead screw 68, which passes through a threaded coupling 66 in the frame 56. As the lead screw 68 is rotated in a clockwise direction, the wear plate is driven inward, forcing the sensor housing 60 to move forward. The alignment cylinder 58 then rides along the optical housing 52, thus moving the sensor 20 closer to the lens 12.

As the lead screw 68 is rotated counterclockwise, the force exerted on the sensor housing 60 is relieved, and the spring 73 pushes the alignment cylinder 58 and thus the sensor housing 60 away from the lens 12.

The sensor housing 60 could alternatively be directly driven by the counter clockwise rotation of the lead screw 68 without a necessity of the spring 73 but this would require additional mechanical attachment to the sensor housing 60.

The lead screw 68 is directly, mechanically connected to a first gear 70 to effectuate such rotation. The first gear 70 is mechanically interconnected with a second gear 74, driven by the motor 40. Thus, as the ranging system 36 passes the distance to the object to the microprocessor 38, and the microprocessor 38 determines a proper focal plane position, the microprocessor 38 can then electronically signal the motor 40 to rotate the lead screw 68 forward or backward to a proper focal plane position of the sensor 20.

Figure 4:
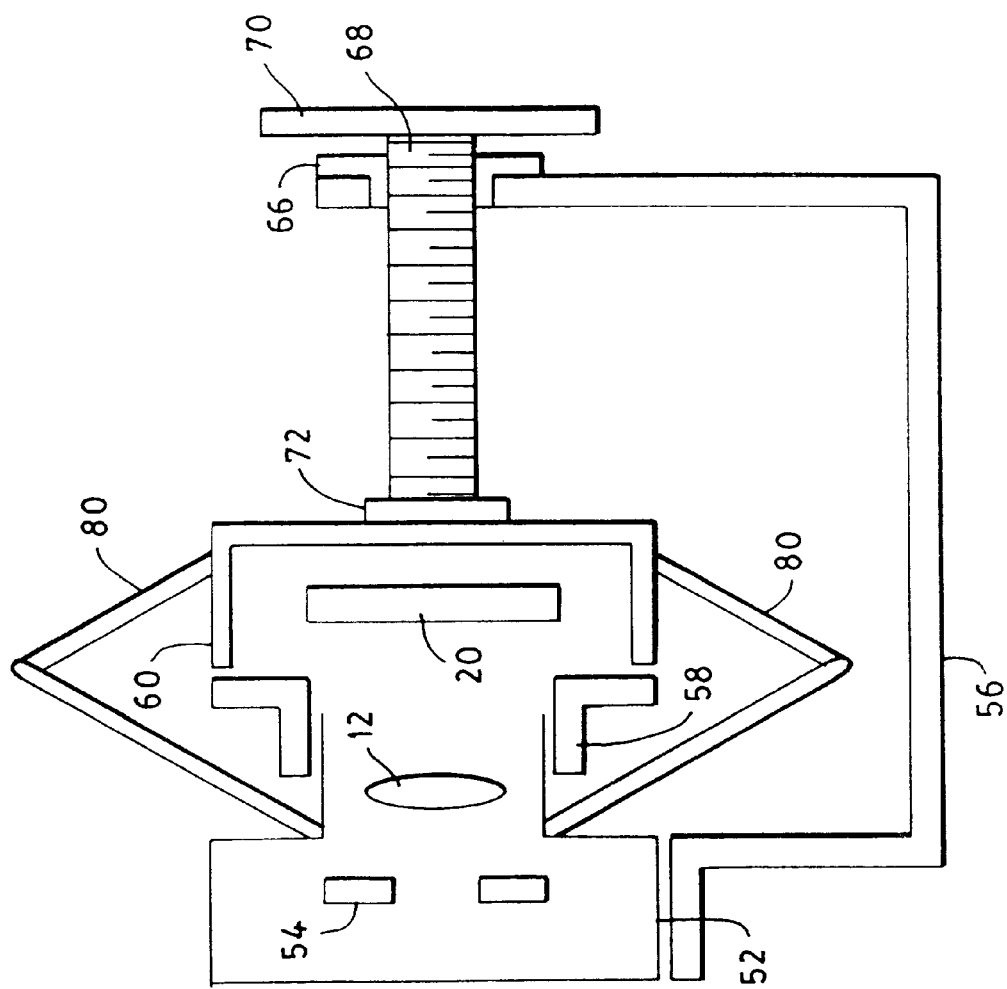
FIG. 4 shows a mechanical drawing of an alternative embodiment of an electronic still camera using the system described in FIG. 2.

FIG. 4 illustrates an alternative embodiment of the sensor movement mechanism of FIGS. 3A and 3B. The image-bearing light 46 reflected from an object comes through the shutter 54 into the lens 12. When the shutter 54 opens, an aperture is created allowing the image bearing light 46 to pass therethrough, thus striking the sensor 20.

The optical housing is held on a frame 56 which is mechanically connected to the housing of the electronic still camera 30.

The wear plate 72 is secured to a back portion of the sensor housing 60 such that force applied to the wear plate 72 pushes the sensor housing 60 forward with respect to the optical system 48.

Alignment of the sensor using a set of two or more flexures 80 that are mechanically connected to the sensor housing 60 and the optical housing 52. The flexures 80 allow the sensor housing 60 to move forward and backward with respect to the optical system 48 in response to rotation of the lead screw 68 while limiting rotational motion, thus preventing rotation of the sensor housing 60 about the optical axis 57.

Further, the flexures 80 have an outward bias that places a substantially constant outward force on the sensor housing 60 pushing the sensor 20 away from the lens 12. Thus, as the lead screw 68 is driven backward, away from the lens, the flexures 80 move the sensor housing 60 away from the lens.

The wear plate 72 is driven by a lead screw 68, which passes through a threaded coupling 66 in the frame 56. As the lead screw 68 is rotated in a clockwise direction, the wear plate is driven inward, forcing the sensor housing 60 to move forward. The alignment cylinder 58 then rides along the optical housing 52, thus moving the sensor 20 closer to the lens 12.

As the lead screw 68 is rotated counterclockwise, the force exerted on the sensor housing 60 is relieved, and the flexures 80 push the alignment cylinder 58 and, thus the sensor housing 60, away from the lens 12.

The lead screw 68 is mechanically connected to a first gear 70 to effectuate such rotation. As previously described, a motor such as a stepper motor is then used to drive the first gear 70.

Figure 5:
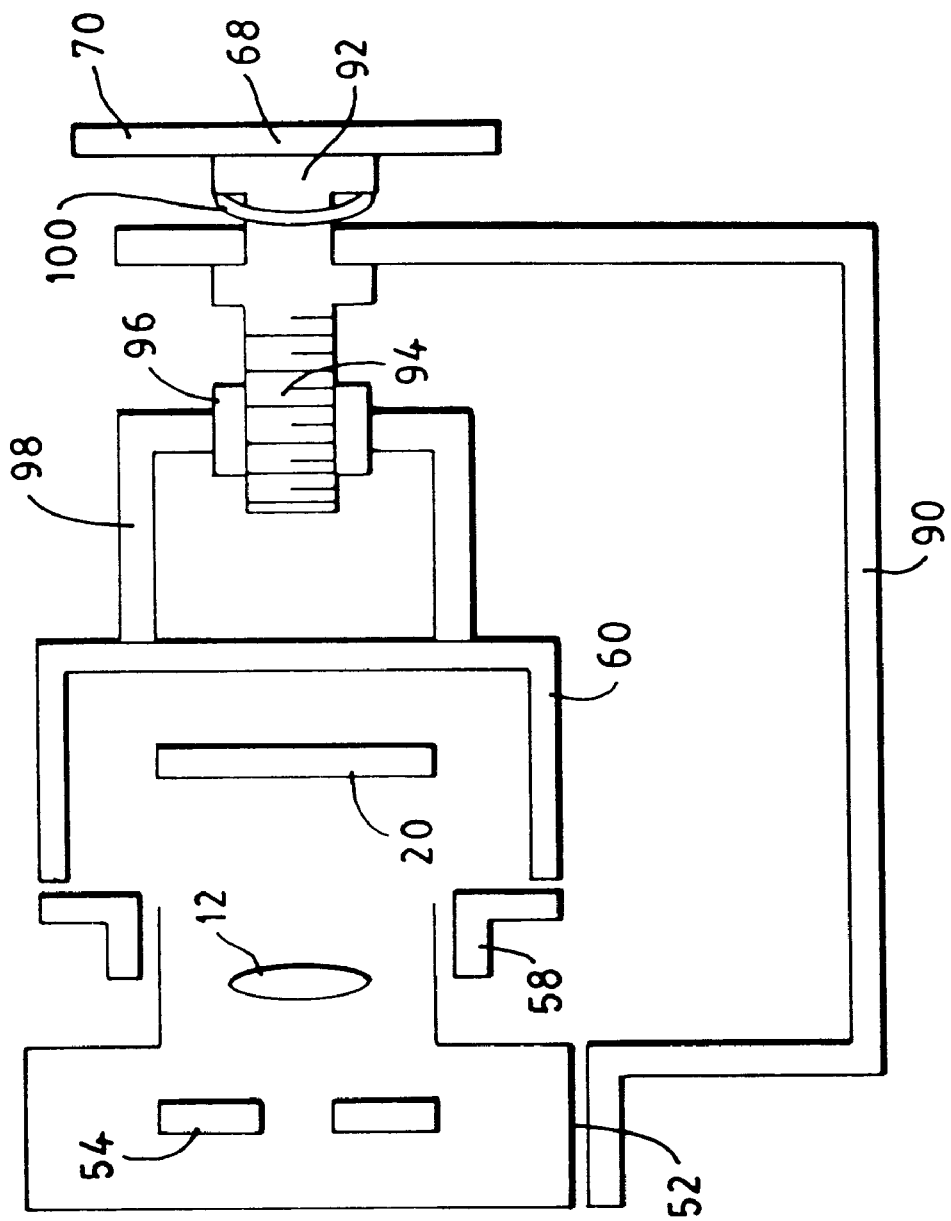
FIG. 5 shows a mechanical drawing of an alternative embodiment of an electronic still camera using the system described in FIG. 2.

FIG. 5 illustrates another alternative embodiment of the sensor movement mechanism of FIGS. 3A and 3B. The image-bearing light 46 reflected from an object comes through the shutter 54 into the lens 12. When the shutter 54 opens, an aperture is created allowing the image bearing light 46 to pass therethrough, thus striking the sensor 20.

The optical housing is held on a frame 90 which is mechanically connected to the housing of the electronic still camera 30.

A sensor housing 60 is connected to an alignment cylinder 58 which has a close sliding fit with the optical housing 52. The alignment cylinder 58 is disposed over the optical housing 52 such that reciprocal motion is enabled.

The sensor housing 60 is mechanically connected to a follower assembly 98. The follower assembly 98 moves the sensor housing 60 forward and backward with respect to the optical system 48 in response to rotation of the lead screw 94.

The lead screw 94 is secured in the frame 90 at a portion of the lead screw 94 that forms a journal bearing 92. This allows the lead screw 68 to rotate freely with respect to the frame 90. A load washer 100 is also used which biases the journal bearing 92 such that linear motion with respect to the frame 90 is limited. Since, in the preferred embodiment, one stop corresponds to linear motion of the sensor 20 of 0.000375 inches, the load washer 100 places a substantially constant load on the journal bearing 92 to limit unwanted linear motion.

As the lead screw 94 is rotated in a clockwise direction, a nut 96 integral with the follower assembly 98 is driven linearly outward forcing the sensor housing 60 to move away from the lens 12. The alignment cylinder 58 then rides along the optical housing 52, thus moving the sensor 20 away from the lens 12.

Likewise, as the lead screw 94 is rotated counterclockwise, the nut 96 is driven linearly inward forcing the follower assembly to move the sensor housing 60 closer to the lens 12. The alignment cylinder 58 then rides along the optical housing 52, thus moving the sensor 20 closer to the lens 12.

An alignment pin (not shown) similar to that previously described is again used to assist in alignment of the sensor housing 60 and to inhibit rotation of the sensor housing with respect to the optical axis.

As previously described, the lead screw 68 is directly, mechanically connected to a first gear 70 to effectuate such rotation.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. An electronic still camera having an optical system for focusing image-bearing light reflected from a subject along an optical path onto a sensor which converts the image-bearing light into signals representative of the subject, said electronic camera comprising:

a sonar ranging system for producing a ranging signal representative of the distance from the subject to the sensor; and adjustment means, responsive to said ranging signal, for moving the sensor along the optical path relative to the optical system such that focus of the subject is effected, said adjustment means comprising a lead screw in mechanical communication with the sensor such that rotation of said lead screw about a longitudinal axis produces motion of both said lead screw and the sensor alone said longitudinal axis; and alignment means for maintaining rotational alignment of the sensor with the optical path.

2. The electronic still camera according to claim 1 wherein rotation of said lead screw in a first direction applies a drive force to drive the sensor toward the optical system, and rotation of said lead screw in a second direction removes said drive force from the sensor.

3. The electronic still camera according to claim 2 further comprising elastic means in mechanical communication with the sensor for biasing the sensor away from the optical system such that rotation of said lead screw in said second direction causes said elastic means to move the sensor away from the optical system.

4. The electronic still camera according to claim 1 wherein the sensor is disposed in a sensor housing comprising an axial groove, and said alignment means protrudes from the optical system into said axial groove to maintain alignment of the sensor.

5. The electronic still camera according to claim 4 wherein said alignment means comprises a set of flexures mechanically interconnecting the optical system and said sensor housing to restrict rotational motion of the sensor.

6. The electronic still camera according to claim 5 wherein said flexures are elastically biased to move the sensor away from the optical system.

7. The electronic still camera according to claim 1 further comprising a motor in mechanical communication with said adjustment means, said motor reversibly actuatable in a first direction and a second direction, actuation of the motor in said first direction causing said motor to drive said adjustment means such that the sensor moves toward the optical system, and actuation of said motor in said second direction causing said motor to drive said adjustment means such that the sensor moves away from the optical system.

8. The electronic still camera according to claim 7 wherein said lead screw is disposed along an axis substantially parallel to the optical path such that rotation of said lead screw moves the sensor.

9. The electronic still camera according to claim 8 further comprising:

a camera housing wherein the optical system is fixed relative to said camera housing; and elastic means in mechanical communication with said camera housing and said lead screw for applying a bias against said lead screw to minimize unintended motion of said lead screw.

10. A focusing system for use in an apparatus having optics through which image-bearing light from a subject passes to an electronic sensor disposed within a housing, said focusing system comprising:

sonar ranging means for determining the range to the subject;

processing means in electrical communication with said ranging means for determining the focal plane as a function of the range to the subject;

a motor in electrical communication with said processing means for moving the sensor to the position of the focal plane in response to a signal from said processing means; and, a lead screw in mechanical communication with the housing such that rotation of said lead screw about a longitudinal axis produces motion of both said lead screw and the sensor along said longitudinal axis, rotation of the lead screw in a first direction applies a drive force to drive the housing toward the optics, and rotation of the lead screw in a second direction removes said drive force from the housing.

11. The focusing system according to claim 10 wherein actuation of said motor in said second direction causes said motor to drive said lead screw such that said sensor moves away from the optics.

12. The focusing system according to claim 10 further comprising elastic means in mechanical communication with said housing for biasing said housing away from the optics such that rotation of said lead screw in said second direction causes said elastic means to move said housing away from the optics.

13. The focusing system according to claim 10 further comprising alignment means in mechanical communication with said housing for maintaining alignment of the sensor with the optics.

14. A method of focusing an electronic still camera which uses a sensor to capture image-bearing light reflected from a subject through camera optics, said method comprising the steps of:

using sonar means to determine a range to the subject;

determining the focal plane as a function of the range to the subject; and electrically moving the sensor to the position of the focal plane by actuating a lead screw to move both said lead screw and the sensor so as to bias the sensor against the bias of an elastic means.

* * * * *